United States Patent [19]
Tselesin

[11] Patent Number: 5,190,568
[45] Date of Patent: Mar. 2, 1993

[54] ABRASIVE TOOL WITH CONTOURED SURFACE

[76] Inventor: Naum N. Tselesin, 2900 Lookout Pl., Atlanta, Ga. 30305

[21] Appl. No.: 741,678

[22] Filed: Aug. 7, 1991

Related U.S. Application Data

[63] Continuation-in-part of Ser. No. 712,989, Jun. 10, 1991, and a continuation-in-part of Ser. No. 467,958, Jan. 22, 1990, Pat. No. 5,049,165, which is a continuation-in-part of Ser. No. 303,924, Jan. 30, 1989, Pat. No. 4,925,457.

[51] Int. Cl.$^5$ .............................................. B24D 3/00
[52] U.S. Cl. ....................................... 51/293; 51/295; 51/307
[58] Field of Search ........................... 51/293, 295, 307

[56] References Cited

U.S. PATENT DOCUMENTS

| | | | |
|---|---|---|---|
| 3,906,684 | 9/1975 | Marshall et al. | 51/295 |
| 3,942,959 | 3/1976 | Markoo et al. | 51/295 |
| 4,047,902 | 9/1977 | Wiand | 51/295 |
| 4,163,647 | 8/1979 | Swiatek | 51/295 |
| 4,543,106 | 9/1985 | Parekh | 51/295 |
| 4,826,508 | 5/1989 | Schwartz et al. | 51/293 |
| 4,925,457 | 5/1990 | deKok et al. | 51/293 |

Primary Examiner—William R. Dixon, Jr.
Assistant Examiner—Willie J. Thompson
Attorney, Agent, or Firm—James B. Middleton

[57] ABSTRACT

An abrasive material has a contoured surface defining peaks and valleys, and side walls connecting the two. The peaks, side walls and valleys are covered with diamonds or other hard particles for effecting the grinding. In the beginning, the hard particles support one another laterally to prevent premature removal of particles, and the valleys provide for fluid flow for debris removal, cooling and protection of the retaining matrix. Later, the particles on the side walls, and eventually those in the valleys, become active in grinding, so that tool life is extended.

18 Claims, 3 Drawing Sheets

_Fig_16      _Fig_17

_Fig_18

_Fig_20

_Fig_19

_Fig_7

5,190,568

ABRASIVE TOOL WITH CONTOURED SURFACE

CROSS-REFERENCE TO RELATED APPLICATIONS

This application is a continuation-in-part of the co-pending applications of the same inventor titled "Patterned Abrasive Material and Method", Ser. No. 712,989, filed on Jun. 10, 1991, and "Composite Material", Ser. No. 467,958, filed Jan. 22, 1990, now U.S. Pat. No. 5049165, the latter being in turn a continuation-in-part of application Ser. No. 303,924, filed on Jan. 30, 1989, now U.S. Pat. No. 4,925,457.

INFORMATION DISCLOSURE STATEMENT

There are many forms of abrasive tools wherein diamonds or other hard particles are embedded within a matrix material, the hard particles providing the abrasive quality while the matrix material serves only to hold the hard particles. However, when there is a high concentration of abrasive particles on the working surface of the tool, it is difficult to provide adequate pressure for effective grinding. Further, closely spaced particles render removal of debris difficult. In the past, some of these abrasive tools have had a contoured surface since it is well known that the force per unit area is increased by decreasing the area. However, the prior art abrasive tools have provided discrete shapes such as frustoconical projections, stripes and the like, and the hard particles have been provided only on the generally flat surface that contacts the work piece. The prior art philosophy is that the immediate working surface is the only surface that grinds, so the placing of hard particles on other surfaces of the tool is merely waste. The resulting tools have a relatively short life since the tool must be replaced when the hard particles are worn off.

Contoured surfaces have been provided with diamonds throughout the surface, but the prior art has provided these surfaces only by electrodeposition, with an electroplated matrix. As a result, usable sharp edges are not obtainable, and any tool with a long useful life is not obtainable.

SUMMARY OF THE INVENTION

This invention relates generally to abrasive tools, and is more particularly concerned with an abrasive tool having a contoured working surface, all portions of the contoured surface having abrasive qualities for a long-life tool.

The present invention provides an abrasive tool having a working surface that is contoured; for example the working surface may be corrugated, serrated or the like, with smooth lines or jagged lines or the like. The entire contoured surface includes hard, abrasive particles so that all portions of the surface are capable of abrading or grinding. Further, while the tips of the contoured surface are grinding, the valleys between the tips act as channels to allow removal of waste and to allow flow of coolant. It has also been found that, by covering the entire contoured surface with hard particles, the particles in the valley portions and/or on the sides protect the retaining matrix and may also support the active particles located on the peaks. The particles in the valley portions and/or on the sides therefore serve the functions of protecting the retaining matrix, initially supporting other particles, and later becoming active grinding particles.

The tool of the present invention can utilize the features disclosed in the above identified patent applications by the same inventor in that a mesh may be used merely to place the hard particles, or both to place and to support the hard particles and the matrix. Also, the contoured surfaces of the present invention may be utilized in patterns as disclosed in application Ser. No. 712,989.

BRIEF DESCRIPTION OF THE DRAWINGS

These and other features and advantages of the present invention will become apparent from consideration of the following specification when taken in conjunction with the accompanying in which.

DETAILED DESCRIPTION OF THE EMBODIMENTS

Referring now more particularly to the drawings, and to those embodiments of the invention here presented by way of illustration, FIGS. 1-4 illustrate some contours that may be utilized with the present invention. It will of course be realized by those skilled in the art that the contours illustrated are only by way of example, and the range of possible profiles is virtually unlimited.

Figure 1A:
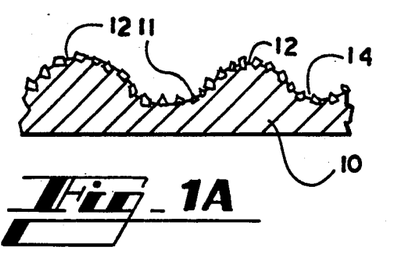
FIG. 1A is a cross-sectional view showing an abrasive contoured surface made in accordance with the present invention.

FIG. 1A shows a carrier 10 having a diamond layer 11 fixed thereto. The surface of the carrier 10 is generally sinusoidal, and the diamond layer 11 follows the sinusoidal path.

It is well recognized that, by decreasing the surface area, the force per unit area is increased in an abrasive tool. Thus, the prior art includes abrasive tools having a contoured profile that includes high areas and low areas. However, the prior art abrasive tools generally have only flat surfaces as the working surfaces; and, more importantly, only the high, flat surfaces are provided with diamonds or other hard, abrasive particles. The philosophy and understanding in the prior art is that hard particles would be simply wasted if they were distributed on the sides of the raised portions, and in the valleys of the tool.

The present invention goes counter to the conventional wisdom by providing a complete layer, or plurality of layers, of hard particles along the entire surface of the abrasive tool. Thus, in FIG. 1A the hard particles follow the complete sinusoidal pat including both peaks 12 and valleys 14.

Far from being wasted, the hard particles that are on the sides of the raised portions, and in the valleys 14, serve two useful functions. In the first place, the fact that there is a complete layer of hard particles 11 protects and/or supports the matrix and the individual particles on the peaks 12 of the abrasive tool. Those skilled in the art will understand that, during use, some of the hard particles may be dislodged from their position in the abrasive tool. Once one particle is dislodged, surrounding particles are more vulnerable to the lateral forces, and additional particles are likely to be dislodged. The present invention therefore provides protection and/or lateral support for the matrix and all of the hard particles to assist in retaining the particles in their position on the abrasive tool.

Figure 1B:
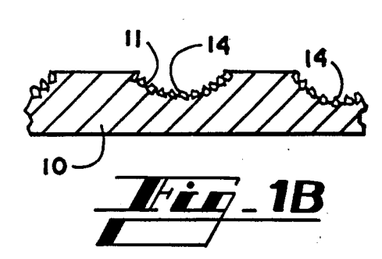
FIG. 1B is a cross-sectional view showing the device of FIG. 1A after some wear.

The second function of the layer 11 of hard particles can be understood better with reference to FIG. 1B. In FIG. 1B, the peaks 12 have been worn off through use. In a prior art abrasive tool, the tool in the condition of that shown in FIG. 1B would be of no use whatsoever. In the tool of the present invention, it will be seen that there are still areas of the tool having at least portions of the layer 11 of hard particles. Thus, where the hard particles will still engage a surface, the tool can be used for further grinding or polishing. It will be understood that the carrier 10, which is generally a matrix of some form to hold the hard particles therein, will usually wear more readily than the layer of hard particles 11. As a result, the areas where the carrier 10 is exposed will wear quickly and be removed from contact with the surface to be polished. This leaves the hard particles 11 in contact with the surface to be polished. Again, the area actually contacting the surface to be ground or polished will actually be relatively small, so the force per unit area will be relatively large.

In both FIG. 1A and FIG. 1B there is sufficient valley 14 to provide channels in the abrasive tool. These channels are sufficient to allow the removal of work piece chips, dust and the like, along with coolant fluid and debris from the tool. This condition will remain until the tool is so worn that the hard particles 11 in the valleys 14 are being utilized as the abrasive. At this point, there will be a relatively large area of the matrix, or carrier 10, that may be worn away sufficiently to provide room to accommodate the chips and debris, and provide some channels for flow of fluids and the like.

Figure 2A:
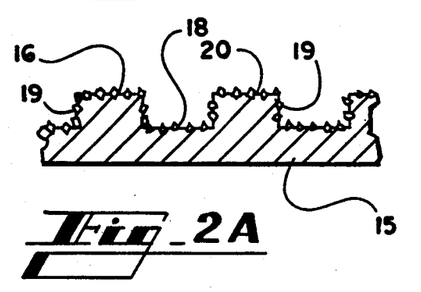
FIG. 2A is a view similar to FIG. 1A but showing a modified surface.
Figure 2B:
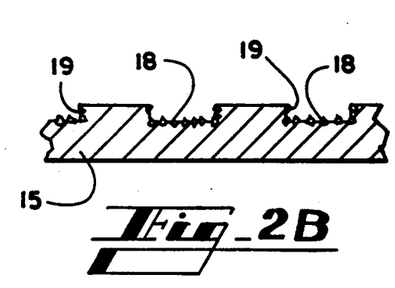
FIG. 2B is a view similar to FIG. 1B but showing the contour of FIG. 2A.

Looking next at FIGS. 2A and 2B, it will be seen that the tool is substantially the same as that shown in FIGS. 1A and 1B, except that the carrier 15 has flat peaks 16 and flat valleys 18 with generally vertical walls 19 therebetween. Still, the layer of hard particles 20 extends over the entire surface, through the flat valleys 18, the vertical walls 19 and the flat peaks 16. As before, the peaks 16 will be worn away, while the valleys 18 act as channels for flow of coolant fluid and debris. As the peaks 16 are worn down, the channels provided by the valleys 18 become somewhat smaller, and the amount of hard particles contacting in the surface become somewhat less. As with the tool of FIG. 1, the tool of FIG. 2 will be usable so long as there are hard particles 20 remaining.

Figure 3A:
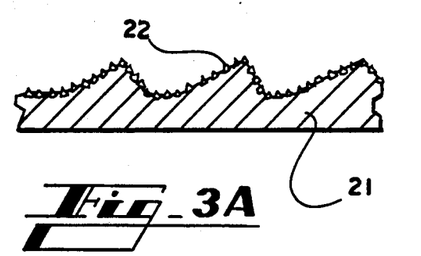
FIG. 3A is a view similar to FIG. 2A but showing another modified surface.
Figure 3B:
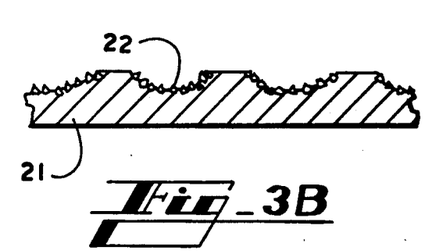
FIG. 3B is a view similar to FIG. 2B but showing the contour of FIG. 3A.
Figure 4A:
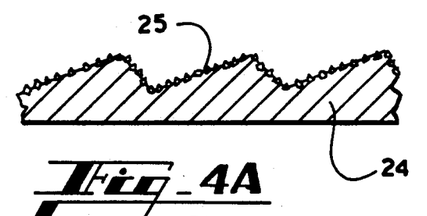
FIG. 4A is a view similar to FIG. 3A but showing a further modified surface.
Figure 4B:
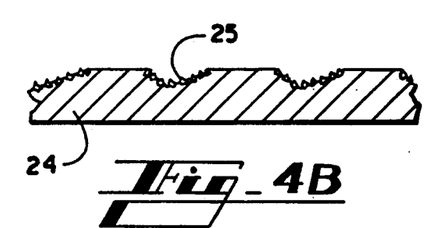
FIG. 4B is a view similar to FIG. 2B but showing the contour of FIG. 4A.

FIGS. 3 and 4 illustrate further specific designs, FIG. 3 having a carrier 21 and a layer of hard particles 22, while FIG. 4 has a carrier 24 and a layer of hard particles 25. As in FIGS. 1 and 2, FIGS. 3 and 4 include FIGS. 3A and 4A showing the full profile of the abrasive tools, and FIGS. 3B and 4B showing the same tools after some wear. FIGS. 3 and 4 show a non-sinusoidal surface of a hard particle carrier. The carrier may have triangular teeth with even (as shown in FIG. 3) or uneven (as shown in FIG. 4) sides.

Figure 5:
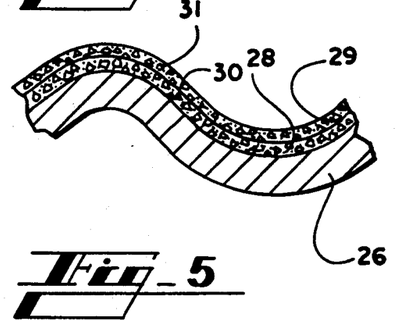
FIGS. 5, 6 and 7 are cross-sectional views showing further modified forms of abrasive contoured surfaces.

FIGS. 1-4 illustrate a carrier having a layer of hard particles, the hard particles being simply supported in the surface of the carrier itself. FIG. 5 illustrates a carrier 26, and two discrete layers 28 and 29, the layers 28 and 29 having hard particles 30 and 31 respectively therein. This arrangement can be accomplished in several different ways. It will be readily understood that the material disclosed in the co-pending application Ser. No. 467,958 might be created, then conformed to the surface of the carrier 26 and fixed thereto. Alternatively, the hard particles 31 can be prepared in one layer, while the particles 30 are prepared in a second layer, and the carrier 26 providing a third layer. All three layers might then be processed, e.g. compacted and sintered simultaneously. All of these techniques are contemplated by the present invention.

Figure 6:
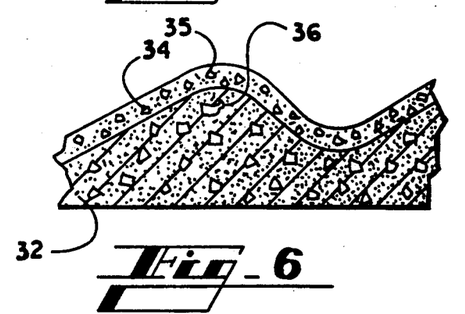

FIG. 6 illustrates a carrier 32 and a layer 34 extending along the contoured surface of the carrier 32. The layer 34 may be provided in many of the ways described in conjunction with the device of FIG. 5. While there is only a single layer 34 having hard particles 35 therein, the carrier 32 also includes a plurality of hard particles 36.

Figures 7, 18, 19, 20:
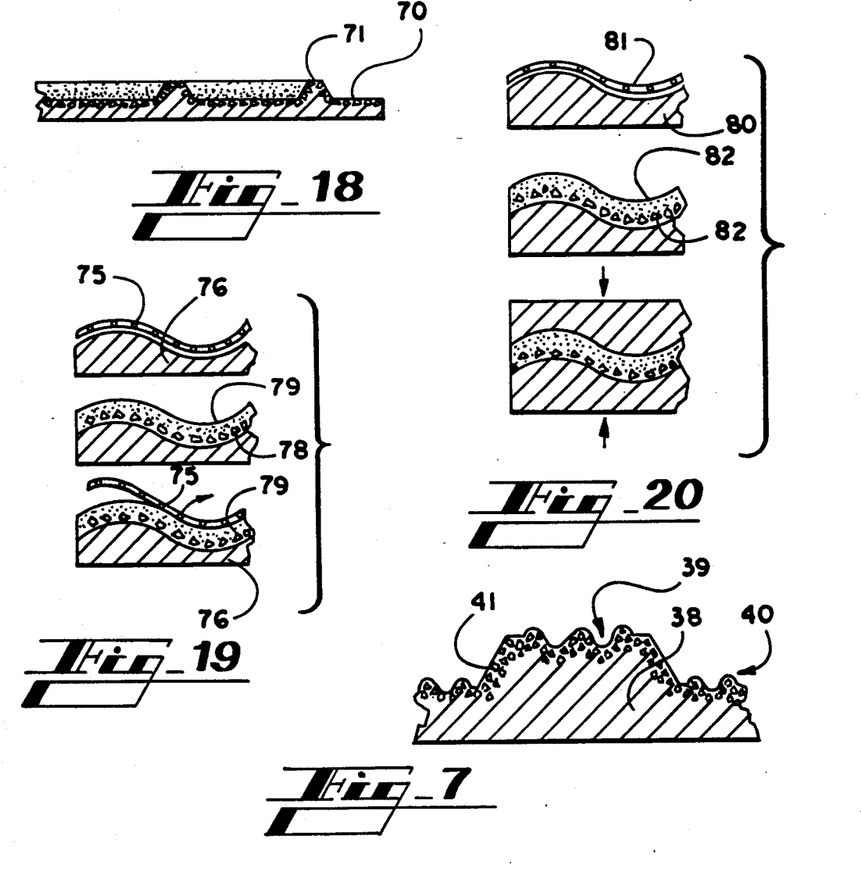
FIG. 18 is an enlarged cross-sectional view taken substantially along the line 18—18 in FIG. 16.
FIGS. 19 and 20 are schematic illustrations showing formation contoured abrasive surfaces in accordance with the present invention.

FIG. 7 of the drawings shows a carrier 38 having a peak 39 and valleys 40 with sloped sides 41 connecting the peaks 39 and the valley 40. FIG. 7 is different from FIG. 2 primarily in that the peak 39 is itself a contoured surface, the peak 39 being here shown as somewhat sinusoidal in cross-section. Also, the valley 40 is contoured, the contour being shown as sinusoidal.

It will therefore be understood by those skilled in the art that one can make a contoured tool having the entire surface covered with a layer of hard particles, or a plurality of layers of hard particles, and the peaks and valleys of the contoured surface may themselves be further contoured. The additional contours will simply further the usual advantages of contoured surfaces in that the force per unit area will be increased and channels are provided for flow of coolant and removal of debris.

Figure 8:
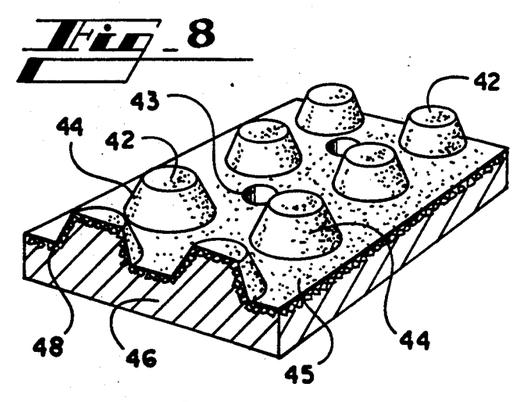
FIG. 8 is a fragmentary perspective view showing a contoured abrasive surface made in accordance with the present invention.

FIG. 8 is a perspective view showing an area of a surface rather than simply a profile. In FIG. 8 it will be seen that the peaks 42 comprise the upper surfaces of frustoconical projections 44 which extend from a lower surface 45, the lower surface 45 making up the valleys between the peaks 42. As before, there is a carrier 46 which supports the continuous layer 48 of hard particles. The carrier may define holes 43 therethrough for carrying coolant fluid and removing debris, and/or may include some surface areas that do not contain abrasive particles.

Figure 9:
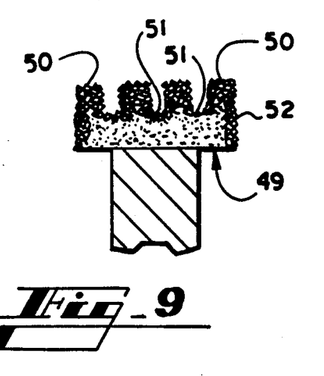
FIG. 9 is a cross-sectional view showing a saw edge made in accordance with the present invention.

FIG. 9 is a cross-sectional view through the edge of a circular saw or the like. In accordance with the previously discussed invention, the cutting segment 49 includes peaks 50 and valleys 51, the entire surface of the segment 49 being covered with at least one, and perhaps a plurality of layers of hard particles 52.

When the saw shown in FIG. 9 is first used, it will be readily recognized that the peaks 50 will be engaged in cutting while the valleys 51 will not be cutting, but will provide channels for coolant flow. When the hard particles 52 are worn from the peaks 50, there will still be cutting by the hard particles 52 on the vertical sides of the peaks 50 so the segment 49 can be used until there is virtually nothing left of the segment.

Figures 10, 11, 12, 13, 14, 15:
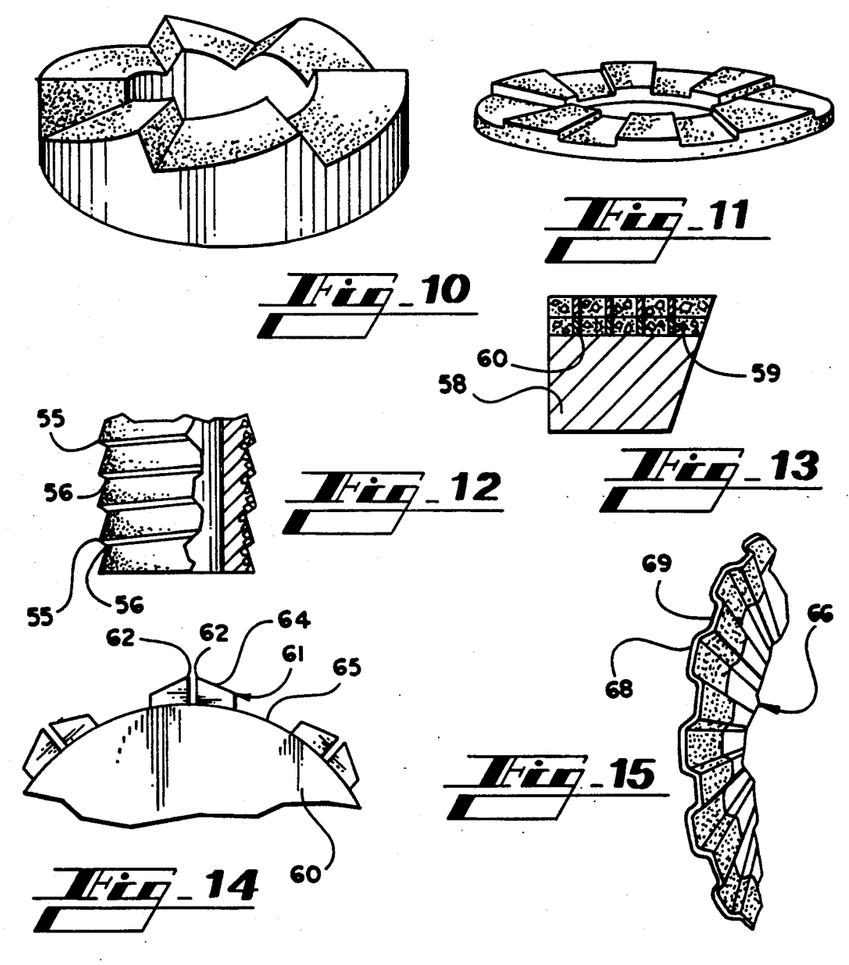
FIG. 10 is a perspective view showing the end of a drill or the like made in accordance with the present invention.
FIG. 11 is a perspective view showing a grinding or polishing tool made in accordance with the present invention.
FIG. 12 is a fragmentary view, partially in cross-section, showing a drill or reaming tool made in accordance with the present invention.
FIG. 13 is a cross-sectional view showing a lathe tool made in accordance with the present invention.
FIG. 14 is a fragmentary side elevational view showing a circular saw blade made in accordance with the present invention.
FIG. 15 is a fragmentary perspective view showing another form of rotary saw blade made in accordance with the present invention.

FIGS. 10 and 11 illustrate circular tools having configurations similar to those shown in FIGS. 3 and 2 respectively. Though the profile is arranged in a circular pattern rather than straight, the previous descriptions should suffice for a full understanding.

FIG. 12 illustrates a drill made of a helical winding. The helical winding provides peaks 55 and valleys 56, the configuration being substantially the same as that shown in FIG. 4.

FIG. 13 is a cross-sectional view through a lathe tool. In this tool, the carrier 58 will be tool steel, cemented carbide or the like for attachment to the lathe in the conventional manner. The cutting edge of the tool is formed by an abrasive material made in accordance with the present invention. In FIG. 13 it will be seen that the hard particles 59 are supported by a mesh material 60, FIG. 13 showing two layers of the mesh 60 and hard particles 59.

Those skilled in the art will understand that the prior art lathe tools that utilize diamond o the like as a cutting medium tend to use polycrystaline diamond (PCD) which is both expensive and brittle. By utilizing the technology of the present invention, normal industrial diamonds or other superabrasive materials, whether natural or artificial, can be utilized to provide any shape of tool desired. The tool steel carrier 58 can be shaped as required, then one or more layers of diamond-containing material can be fixed to the carrier 58, each layer being shaped prior to attachment to the carrier 58.

FIG. 14 shows another form of circular saw made in accordance with the present invention. In FIG. 14 there is a circular disk 60 to act as the primary carrier; and, there are abrasive tools 61 extending from the circumference of the carrier 60. The abrasive tools 61 are generally trapezoidially shaped to provide a peak 62 and a sloped surface 64. There are valleys 65 between adjacent abrasive tools 61.

With the above described arrangement, and remembering the technique discussed above, it will be understood that the peaks 62 will engage the work piece so there is a relatively small surface area. As the peaks 62 wear down, the underlying material will be worn away quickly, while hard particles in the surface 64 will continue to engage the work piece. The result is a constant, small area of hard particles engaging a work piece to increase the force per unit area. The valleys 65 will continue to allow coolant flow and removal of debris.

FIG. 15 shows yet another form of circular saw. In FIG. 15, the contour of the surface is lateral rather than vertical (or, radial). Thus, the saw blade 66 shown in FIG. 15 has a constant radius, but the lateral configuration of the saw varies. With this configuration, the designation of peaks and valleys is somewhat arbitrary but peaks are indicated at 68 and valleys are indicated at 69. It will be understood that both peaks and valleys 68 and 69 will engage the work piece simultaneously, but the zig-zag nature of the cutting surface will allow radially directed flow of coolant and removal of debris. Of course the hard particles can extend as far into the blade 66 radially as may be desired.

In plan view, the peaks and valleys on the tool of the present invention can be arranged in any desired pattern, as is shown in FIGS. 10, 11, 16 and 17. Peaks and valleys can create either discontinuous or continuous channels and skeletons, and may create a single continuous channel on a tool or a plurality of separate channels on a tool. The separate channels may or may not be interconnected.

When an abrasive disk or the like is used for grinding or polishing a surface, there is a tendency to cause streaks in the surface being ground or polished because of the discrete motions of the disk. The abrasive tools shown in FIGS. 16 and 17 will overcome this streaking tendency. These abrasive tools include a disk 70 having a raised spiral surface 71. The surface of the tools shown in FIGS. 16 and 17 will be formed in the same manner as those discussed above, and the entire surface can be completely or partially covered with hard particles. Nevertheless, the actual working surface will be in a spiral which tends not to cause streaking. The device in FIG. 16 includes a complete spiral, while the device in FIG. 17 includes interruptions in the spiral. Thus, the peaks 71A in FIG. 17 are shown as extending through four sectors of the disk 70A.

Figure 16:
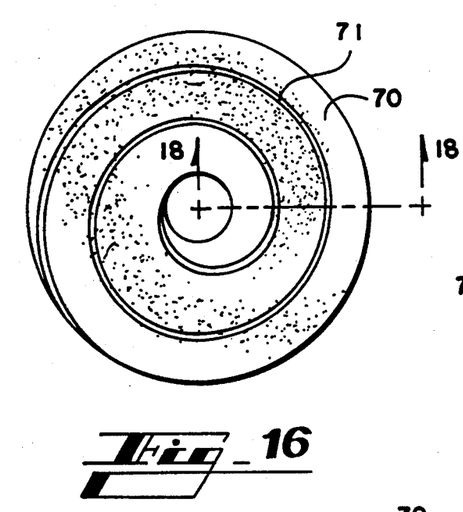
FIGS. 16 and 17 are plan views showing grinding or polishing disks made in accordance with the present invention.
Figure 17:
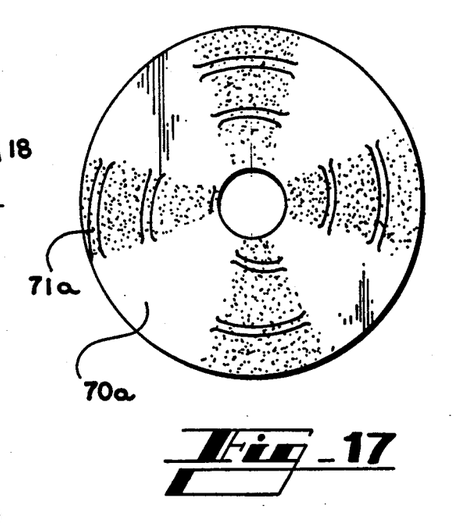

FIG. 18 is an enlarged, cross-sectional view taken along the line 18—18 in FIG. 16 and showing the surface of the disk 70. It will be seen that the surface of the disk 70 is similar to the profile shown in FIG. 2 of the drawings.

In view of the disclosures in the above identified applications by the same inventor, it will be understood that the abrasive tools of the present invention can be formed in many different ways. It will of course be obvious that a layer of hard particles can be provided on a surface, a matrix material at least partially encloses the layer of hard particles, and the combination can then be bound together, with or without compaction. The initial surface on which the hard particles are placed can be contoured as desired so that the finished tool will have the preferred contoured surface.

The co-pending applications disclose the use of a mesh material, and it will be understood that one can place a mesh material 75 on a carrier 76 as shown in FIG. 19. The mesh 75 can be filled with hard particles 78, then placed in contact with a matrix material 79. After the matrix material 79 is in place, the mesh 75 ma be removed. The object of the mesh material 75 then becomes simply to organize the hard particles 78 into the desired pattern with the desired spacing.

It should also be understood that there are several ways in which the mesh 75 may be removed. As illustrated in FIG. 19, the mesh 75 is being physically removed after placement of the matrix material 79. It should also be understood by those skilled in the art that, if the mesh material is made of a material that melts at or below the sintering temperature of the matrix material 79, the mesh 75 will remain in place, but will simply melt so that it is effectively removed.

While one might generally think of utilizing a metal powder as the matrix material 79 so that a relatively high sintering temperature is used, many combinations are possible. The mesh material 75 may be a plastic or resinous material while the matrix material 79 is a high temperature metal powder so that sintering temperature will substantially evaporate the mesh material 75. The mesh material 75 may be a plastic having a relatively low melting temperature while the matrix material 79 may be a plastic material having a higher melting temperature so that, again, the mesh material 75 is effectively removed. The mesh material 75 may also be a metal such as copper while the matrix material 79 is a metal powder such as nickel. At the sintering temperature for nickel, the copper mesh material will be effectively removed. If the mesh is removed, and then the material is sintered, the hard particles can deviate from the somewhat ideal positions as determined by the mesh openings.

Looking at FIG. 20 of the drawings, the carrier 80 is provided with a mesh material 81 conforming to the contoured surface of the carrier 80. The hard particles 82 are placed in the openings of the mesh 81, and a matrix material 82 is added. The layer can then be sintered, with or without pressure, to create the final product. In FIG. 20 the mesh material 81 remains in place. It will be readily understood from the above description that selection of the mesh material and the matrix material will allow the abrasive material to be compacted and sintered, and the mesh material will remain. Furthermore, the matrix material can be provided by electrodeposition or by spraying. The advantages of the mesh material are discussed in the co-pending applications described above, and include assistance in supporting the matrix and the hard particles as well as the spacing and orientation.

It will therefore be understood that the present invention provides a further improvement in abrasive tools in that the surface of the tool is contoured both to provide a higher force per unit area of the working surface, and to provide channels for flow of coolant and removal of debris. The entire contoured surface can be covered with spaced hard particles so the combination of the matrix material with particles held by the matrix material supports the matrix and the neighboring particles for a more durable tool. A mesh may or may not be included. As the tool wears, additional abrasive particles come into contact with the working surface so the tool continues to be usable. The surrounded hard particles distributed throughout the surface therefore provide both for support of the particles and the matrix to prevent loss of the hard particles during use, and provide a longer life for the abrasive surface.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. An abrasive material for grinding or polishing, said abrasive material comprising a carrier for receiving a plurality of hard particles, and means for holding said hard particles to said carrier, said carrier being contoured for defining a plurality of peaks which are in contact with a surface being ground, and a plurality of valleys which are spaced from said surface being ground, said plurality of hard particles substantially uniformly covering at least a portion of said carrier, said portion including both some of said peaks and contiguous ones of said valleys, the arrangement being such that said hard particles are adjacent to one another so that said particles laterally support one another.

2. An abrasive material as claimed in claim 1, said means for holding said hard particles to said carrier comprising a matrix material that at least partially surrounds said hard particles so that said hard particles laterally support one another through said matrix material.

3. An abrasive material as claimed in claim 2, wherein said carrier is formed of said matrix material.

4. An abrasive material as claimed in claim 3, and further including a second plurality of hard particles embedded within said carrier.

5. An abrasive material as claimed in claim 2, and including a plurality of layers fixed to said carrier, a first layer of said plurality of layers having a first plurality of hard particles therein, and a second layer of said plurality of layers having a second plurality of hard particles therein.

6. An abrasive material as claimed in claim 5, and further including a mesh material within at least one layer of said plurality of layers for arranging said plurality of hard particles.

7. An abrasive material as claimed in claim 1, wherein the entire surface of said carrier is substantially uniformly covered with said hard particles.

8. An abrasive material for grinding a workpiece, said abrasive material including a plurality of peaks for initially engaging said workpiece, a plurality of valleys between the peaks of said plurality of peaks, and a plurality of side walls connecting said peaks and said valleys, and a plurality of hard particles, said peaks, said valleys and said side walls being generally uniformly covered with said plurality of hard particles for grinding said workpiece, the arrangement being such that said hard particles on said peaks initially grind said workpiece and said hard particles on said side walls and said valleys grind said workpiece after said peaks are worn away from grinding.

9. An abrasive material as claimed in claim 8, wherein said abrasive material comprises at least one layer of matrix material containing said plurality of hard particles, a carrier for supporting said at least one layer, and including a mesh within said layer for arranging said plurality of hard particles.

10. An abrasive material as claimed in claim 9, wherein said mesh material has a melting temperature below the sintering temperature of said matrix material.

11. The method for making an abrasive material, said abrasive material including a carrier, a plurality of hard particles fixed to said carrier, and means for fixing said hard particles to said carrier, said method including the steps of placing a plurality of hard particles on a contoured surface, and covering said contoured surface and said hard particles with a matrix material for holding said hard particles in the fixed position.

12. The method for making an abrasive material as claimed in claim 11, and including the step of placing a mesh on said contoured surface before the said step of placing a plurality of hard particles on said contoured surface, so that said hard particles are spaced and separated by said mesh.

13. The method for making an abrasive material as claimed in claim 12, and further including the step of removing said mesh after said hard particles are spaced and separated.

14. The method for making an abrasive material as claimed in claim 12, and including the step of sintering said matrix material after the said step of covering said surface and hard particles with a matrix material.

15. The method for making an abrasive material as claimed in claim 14, wherein the said mesh has a melting temperature below the sintering temperature of said matrix material.

16. The method for making an abrasive material as claimed in claim 14, wherein said mesh evaporates at the sintering temperature of said matrix material.

17. The method for making an abrasive material as claimed in claim 14, wherein said mesh has a melting temperature no lower that the sintering temperature of said matrix material.

18. The method for making an abrasive material as claimed in claim 12, and including the step of contouring said mesh before the said step of placing a plurality of hard particles on said contoured surface.

* * * * *

REEXAMINATION CERTIFICATE (2814th)

United States Patent [19]

Tselesin

[11] B1 5,190,568

[45] Certificate Issued Mar. 12, 1996

[54] ABRASIVE TOOL WITH CONTOURED SURFACE

[75] Inventor: Naum N. Tselesin, Atlanta, Ga.

[73] Assignee: Ultimate Abrasive Systems, Inc., Atlanta, Ga.

Reexamination Request:
No. 90/003,407, Apr. 18, 1994

Reexamination Certificate for:
| | |
|---|---|
| Patent No.: | 5,190,568 |
| Issued: | Mar. 2, 1993 |
| Appl. No.: | 741,678 |
| Filed: | Aug. 7, 1991 |

Related U.S. Application Data

[63] Continuation-in-part of Ser. No. 712,989, Jun. 10, 1991, and a continuation-in-part of Ser. No. 467,958, Jan. 22, 1990, Pat. No. 5,049,165, which is a continuation-in-part of Ser. No. 303,924, Jan. 30, 1989, Pat. No. 4,925,457.

[51] Int. Cl.$^6$ .................. B24D 3/00; B24D 17/00; B24D 18/00

[52] U.S. Cl. .................. 51/293; 51/295; 51/307; 451/527; 451/530; 451/540

[58] Field of Search ............... 51/293, 295, 307; 451/527, 529, 530, 533, 534, 539, 540, 544

[56] References Cited

U.S. PATENT DOCUMENTS

| | | | |
|---|---|---|---|
| 2,811,960 | 11/1957 | Fessel | 125/15 |
| 3,353,526 | 11/1967 | Daem et al. | 125/15 |
| 3,860,400 | 1/1975 | Prowse et al. | 51/295 |
| 3,869,263 | 3/1975 | Greenspan | 451/541 |
| 4,114,322 | 9/1978 | Greenspan | 451/548 |
| 4,317,660 | 3/1982 | Kramis et al. | 51/295 |
| 4,925,457 | 5/1990 | deKok et al. | 51/293 |

FOREIGN PATENT DOCUMENTS

| | | | |
|---|---|---|---|
| 0090274A3 | 10/1983 | European Pat. Off. | B24D 7/00 |
| 2256079 | 5/1974 | Germany | B24D 11/00 |
| 2650942 | 5/1978 | Germany | B24D 11/00 |

*Primary Examiner*—Deborah Jones

[57] ABSTRACT

An abrasive material has a contoured surface defining peaks and valleys, and side walls connecting the two. The peaks, side walls and valleys are covered with diamonds or other hard particles for effecting the grinding. In the beginning, the hard particles support one another laterally to prevent premature removal of particles, and the valleys provide for fluid flow for debris removal, cooling and protection of the retaining matrix. Later, the particles on the side walls, and eventually those in the valleys, become active in grinding, so that tool life is extended.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 14 and 18 are cancelled.

Claims 1, 3–13 and 15–17 are determined to be patentable as amended.

New claims 19–23 are added and determined to be patentable.

1. An abrasive material for grinding or polishing, said abrasive material comprising *a plurality of hard particles*, a carrier for receiving [a] *said* plurality of hard particles, and [means] *a sintered matrix material* for holding said hard particles to said carrier, *said sintered matrix material at least partially surrounding said hard particles and being formed from a sinterable matrix material*, said carrier being contoured for defining *a contoured working surface having* a plurality of peaks which are in contact with a surface being ground, and a plurality of valleys *between said peaks* which are spaced from said surface being ground, said plurality of hard particles *being arranged in a pattern and* substantially uniformly covering *said contoured working surface, said contoured working surface covering* at least a portion of *a surface of* said carrier *that faces the surface being ground*, said portion including both [some of] said peaks and contiguous ones of said valleys, the arrangement being such that said hard particles are adjacent to one another so that said particles laterally support one another *through said sintered matrix material, wherein said hard particles, sinterable matrix material and said carrier are simultaneously shaped, compacted and sintered under pressure to form said abrasive material having said contoured working surface*.

3. An abrasive material as claimed in claim [2] *1*, wherein said carrier is formed of said *sintered* matrix material.

4. An abrasive material as claimed in claim 3, [and further] including a second plurality of hard particles embedded within said carrier.

5. An abrasive material as claimed in claim [2] *1*, [and] including a plurality of layers *of sintered matrix material* fixed to said carrier, a first layer of said plurality of layers having a first plurality of hard particles therein, and a second layer of said plurality of layers having a second plurality of hard particles therein.

6. An abrasive material as claimed in claim [5] *1*, [and] further including mesh material [within at least one layer of said plurality of layers] for arranging said plurality of hard particles *in said pattern*.

7. An abrasive material as claimed in claim 1, wherein the entire surface of said carrier is substantially [uniformly] covered with said [hard particles] *contoured working surface*.

8. An abrasive material for grinding a workpiece, said abrasive material [including] *comprising a contoured working surface having* a plurality of peaks for initially engaging said workpiece, a plurality of valleys between the peaks of said plurality of peaks, and a plurality of side walls connecting said peaks and said valleys, [and] a plurality of hard particles, *at least one layer of a sintered matrix material formed from a sinterable matrix material containing said plurality of hard particles, a mesh material within said layer for arranging said plurality of hard particles in a pattern in said layer and a carrier for supporting said at least one layer,* said peaks, said valleys and said side walls being generally uniformly covered with said plurality of hard particles *in said layer* for grinding said workpiece, the arrangement being such that said hard particles on said peaks initially grind said workpiece and said hard particles on said side walls and *on* said valleys grind said workpiece after said peaks are worn away from grinding[.] *, wherein said hard particles, sinterable matrix material, mesh material and carrier are simultaneously shaped, compacted and sintered under pressure to form said abrasive material having said contoured working surface*.

9. An abrasive material as claimed in claim [8] *1*, wherein said abrasive material comprises at least one layer of *sintered* matrix material containing said plurality of hard particles[, a] *fixed to the* carrier for supporting said at least one layer, and including a mesh within said layer for arranging said plurality of hard particles *in said pattern on the contoured working surface*.

10. An abrasive material as claimed in claim 9, wherein said mesh material has a melting temperature below the sintering temperature of said *sintered* matrix material.

11. [The] *A* method for making an abrasive material *having a contoured working surface having a plurality of peaks and a plurality of valleys between said peaks*, said abrasive material including a carrier, a plurality of hard particles fixed to said carrier, and [means] *sintered matrix material* for fixing said hard particles to said carrier, said method [including] *comprising* the steps of [placing] *arranging* a plurality of hard particles [on a contoured surface] *on said carrier in a pattern*, [and] covering [said contoured surface and] said hard particles with a *sinterable* matrix material [for holding said hard particles in the fixed position], *and simultaneously shaping, compacting and sintering under pressure said hard particles, sinterable matrix material and carrier to form said abrasive material having said contoured working surface*.

12. The method for making an abrasive material as claimed in claim 11, [and] including the step of placing a mesh *material* on said [contoured surface] *carrier* before the [said] step of placing a plurality of hard particles on said [contoured surface] *carrier* so that said hard particles are spaced and separated *from each other and arranged in said pattern* by said mesh.

13. The method for making an abrasive material as claimed in claim 12, [and further] including the step of removing said mesh after said hard particles are spaced and separated *and arranged in said pattern before simultaneously shaping, compacting and sintering under pressure, said hard particles, sinterable matrix material and carrier*.

15. The method for making an abrasive material as claimed in claim [14] *12*, wherein [the] *said* mesh *material* has a melting temperature below the sintering temperature of said *sinterable* matrix material.

16. The method for making an abrasive material as claimed in claim [14] *12*, wherein said mesh *material* evaporates at the sintering temperature of said *sinterable* matrix material.

17. The method for making an abrasive material as claimed in claim [14] *12*, wherein said mesh *material* has a melting temperature no lower that the sintering temperature of said *sinterable* matrix material.

*19. The abrasive material as claimed in claim 9, including an additional layer of mesh material in the abrasive material.*

*20. The abrasive material as claimed in claim 8, including an additional layer of mesh material in the abrasive material.*

*21. The abrasive material as claimed in claim 1, wherein the surfaces of the peaks and valleys are contoured.*

*22. The abrasive material as claimed in claim 1, wherein the contoured working surface of said abrasive material comprises a raised spiral surface.*

*23. The abrasive material as claimed in claim 6, wherein said mesh material has a melting temperature below the sintering temperature of said sintered matrix material.*

\* \* \* \* \*